(12) United States Patent
Liu et al.

(10) Patent No.: US 12,504,864 B2
(45) Date of Patent: Dec. 23, 2025

(54) INTERACTIVE METHOD, APPARATUS, ELECTRONIC DEVICE AND STORAGE MEDIUM

(71) Applicant: Beijing Zitiao Network Technology Co., Ltd., Beijing (CN)

(72) Inventors: Chin-Wei Liu, Beijing (CN); Shuo Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/395,374

(22) Filed: Dec. 22, 2023

(65) Prior Publication Data
US 2024/0231572 A1    Jul. 11, 2024

(30) Foreign Application Priority Data
Jan. 10, 2023    (CN) .......................... 202310036004.4

(51) Int. Cl.
| | |
|---|---|
| *G06F 3/0484* | (2022.01) |
| *G06F 3/01* | (2006.01) |
| *G06F 3/04815* | (2022.01) |
| *G06F 3/0487* | (2013.01) |
| *G06F 3/033* | (2013.01) |

(52) U.S. Cl.
CPC ............ *G06F 3/0484* (2013.01); *G06F 3/012* (2013.01); *G06F 3/013* (2013.01); *G06F 3/04815* (2013.01); *G06F 3/0487* (2013.01); *G06F 3/017* (2013.01); *G06F 3/033* (2013.01)

(58) Field of Classification Search
CPC .......... G06F 3/0487; G06F 3/01; G06F 3/011; G06F 3/04815; G06F 3/013; G06F 3/0484; G06F 3/012; G06F 3/033; G06F 3/017
See application file for complete search history.

(56) References Cited

U.S. PATENT DOCUMENTS

| 10,921,879 | B2* | 2/2021 | Ravasz ................... G06F 3/011 |
| 2013/0050069 | A1* | 2/2013 | Ota ........................ G06F 3/0304 345/156 |
| 2016/0253044 | A1* | 9/2016 | Katz ....................... G06F 3/017 345/156 |
| 2018/0336008 | A1* | 11/2018 | Nakagawa ............. G06V 40/28 |
| 2018/0342103 | A1* | 11/2018 | Schwarz .............. G06F 3/04845 |
| 2020/0226814 | A1* | 7/2020 | Tang ..................... G02B 27/017 |
| 2020/0387213 | A1* | 12/2020 | Ravasz ................... G06F 3/011 |

(Continued)

FOREIGN PATENT DOCUMENTS

CN            113672158 A        11/2021

*Primary Examiner* — Olga V Merkoulova
(74) *Attorney, Agent, or Firm* — BakerHostetler

(57) ABSTRACT

The present disclosure provides an interactive method, an interactive apparatus, an electronic device and a storage medium. The interactive method includes: acquiring a triggering operation of a user; displaying a first interactive interface in a display picture in response to the triggering operation of the user, wherein the position of the first interactive interface is configured to move with a moving operation of the user; and displaying an identification area in the display picture and converting the first interactive interface into a second interactive interface to be displayed at a position of the identification area in response to movement data of the first interactive interface satisfying a preset conversion condition.

20 Claims, 4 Drawing Sheets

(56) References Cited

U.S. PATENT DOCUMENTS

| | | | | |
|---|---|---|---|---|
| 2020/0388247 A1* | 12/2020 | Ravasz | ............... | G09G 5/377 |
| 2021/0263593 A1* | 8/2021 | Lacey | ............... | G06V 20/10 |
| 2022/0091722 A1* | 3/2022 | Faulkner | ............ | G06F 3/0485 |
| 2023/0315197 A1* | 10/2023 | Stolzenberg | ........ | G06F 3/011 |
| | | | | 345/633 |

* cited by examiner

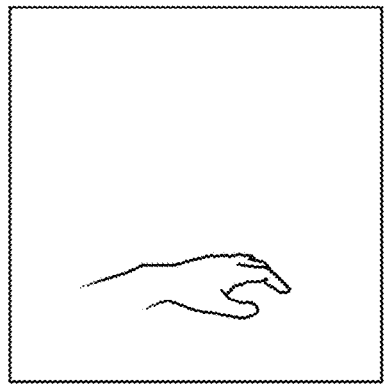
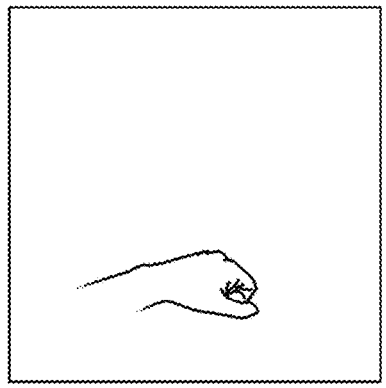
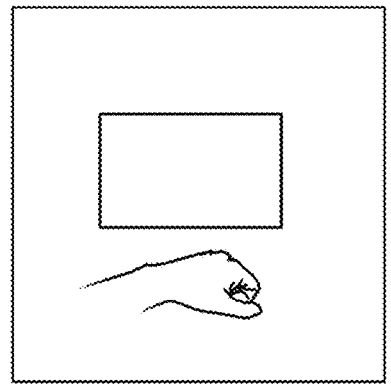
FIG.3A        FIG.3B        FIG.3C
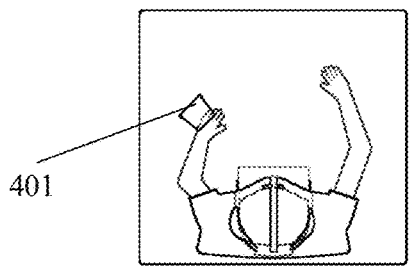
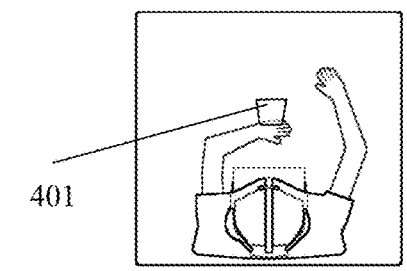
FIG.4A        FIG.4B
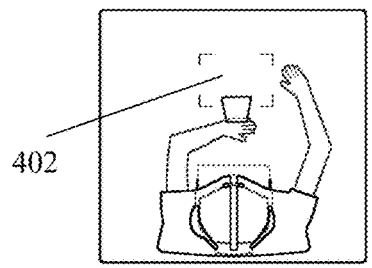
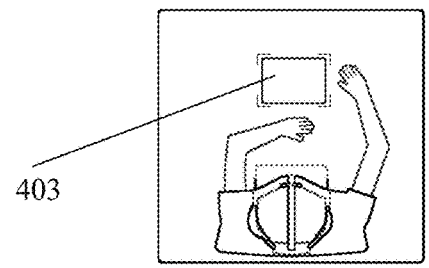
FIG.4C        FIG.4D

INTERACTIVE METHOD, APPARATUS, ELECTRONIC DEVICE AND STORAGE MEDIUM

CROSS REFERENCE TO RELATED APPLICATIONS

This application claims the priority of Chinese Patent Application No. 202310036004.4 filed on Jan. 10, 2023, the disclosure of which is incorporated by reference herein in its entirety as part of the present application.

TECHNICAL FIELD

The present disclosure relates to the technical field of extended reality, and particularly to an interactive method, apparatus, electronic device and storage medium.

BACKGROUND

Extended Reality (XR) refers to combination of reality and virtuality through a computer to create a virtual environment available for human-computer interaction, which is also a general term for a variety of technologies such as Augmented Reality (AR), Virtual Reality (VR) and Mix Reality (MR).

For an Extended Reality device, e.g., a VR device, manual interaction using only hands independently of handles or other controllers has been widely applied. For the manual interaction, the menu is an indispensable function. The way in which the menu is called up is difficult to meet the needs of users.

SUMMARY

The present disclosure provides an interactive method, including: acquiring a triggering operation of a user; displaying a first interactive interface in a display picture in response to the triggering operation of the user, wherein a position of the first interactive interface is configured to move with a moving operation of the user; and displaying an identification area in the display picture and converting the first interactive interface into a second interactive interface to be displayed at a position of the identification area in response to movement data of the first interactive interface satisfying a preset conversion condition.

An embodiment of the present disclosure provides an interactive apparatus including acquiring module, a first interactive module, and a second interactive module.

The acquiring module is configured to acquire a triggering operation of a user.

The first interactive module is configured to display a first interactive interface in a display picture in response to the triggering operation of the user, wherein a position of the first interactive interface is configured to move with a moving operation of the user; and The second interactive module is configured to display an identification area in the display picture and convert the first interactive interface into a second interactive interface to be displayed at a position of the identification area in response to movement data of the first interactive interface satisfying a preset conversion condition.

An embodiment of the present disclosure provides an electronic device, including a memory and at least one processor, and a computer program is stored in the memory and executable on the processor; the at least one processor, when executing the program, implements the interactive method in any of the above embodiments.

An embodiment of the present disclosure provides a non-transient computer readable storage medium storing computer instructions for causing a computer to perform the interactive method in any of the above embodiments.

An embodiment of the present disclosure provides a computer program product, including computer program instructions, wherein the computer program instructions, when executing on a computer, causes the computer to implement the interactive method in any of the above embodiments.

BRIEF DESCRIPTION OF THE DRAWINGS

In order to illustrate the technical solutions in the present disclosure or the related art more clearly, the attached drawings needed in description of embodiments or the related art will be introduced briefly hereinbelow. Apparently, the attached drawings in the following description are only embodiments of the present disclosure, and those of ordinary skill in the art can also obtain other drawings based on these attached drawings without creative efforts.

FIG. 3A to FIG. 3C are schematic diagrams of a triggering operation of another interactive method provided by an embodiment of the present disclosure;

FIG. 4A to FIG. 4D are schematic flow diagrams of another interactive method provided by an embodiment of the present disclosure;

DETAILED DESCRIPTION

In order to make the objective, technical solutions and advantages of the present disclosure more apparent, the present disclosure will be further described in detail hereinafter in conjunction with specific embodiments and with reference to the attached drawings.

It should be noted that, unless otherwise defined, technical terms or scientific terms used in the embodiments of the present disclosure should have the general meanings understood by those of ordinary skill in the art. The words such as "first", "second" and the like used in the embodiments of the present disclosure are not intended to represent any sequence, quantity or importance, but are only used to distinguish different constituent parts. The word such as "comprising", "including" or the like means that an element or object occurring before the word covers elements or objects and equivalents thereof listed after the word, but does not exclude other elements or objects.

As described in the Background, manual interaction using only hands independently of handles or other controllers has been widely applied in the Extended Reality device. The Extended Reality device acquires hand posture data of the user by means of an image acquisition unit, a smart glove or the like, and displays hand posture mapping of the user in a display picture of a head-mounted display device, VR glasses or the like so that the user interacts with the display picture by controlling the hand posture. As can be appreciated by people skilled in the art, the display picture herein may be a virtual picture (e.g., VR) or a picture with combination of reality and virtuality (e.g., MR).

Figure 1:
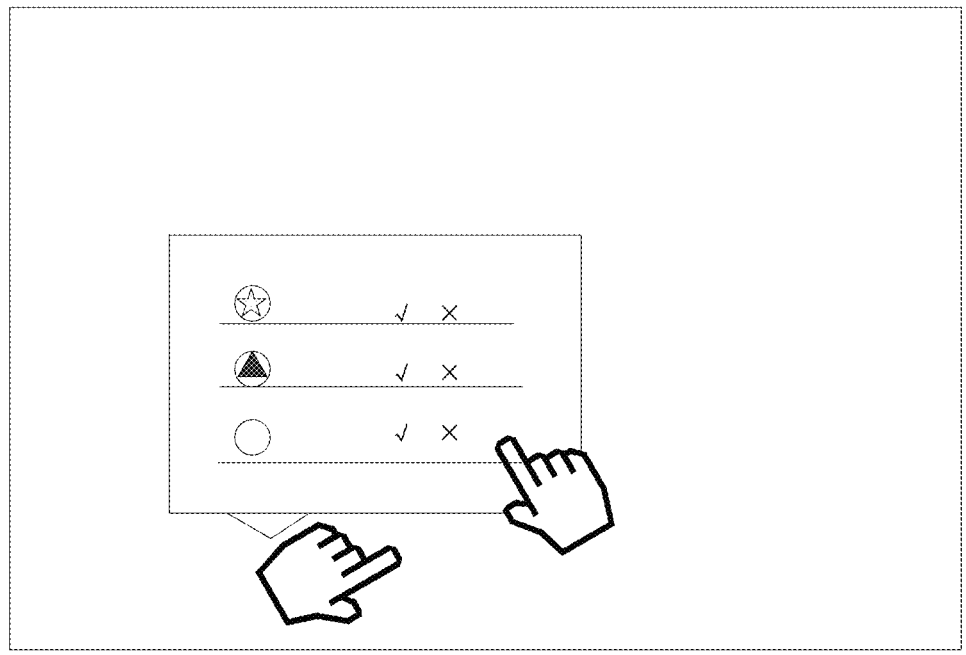
FIG. 1 is a schematic effect diagram of an interactive method provided by an embodiment of the present disclosure.

For the manual interaction, the interactive interface is an indispensible function. As shown in FIG. 1, the interactive interface is bound to the left hand, and interactive items can be selected by the right hand. This requires cooperation of the two hands, and the posture of the left hand is lifting. If there are many menu levels, the user needs higher power consumption in selection, which would affect the selecting capability of the user and degrade the user experience.

The embodiments of the present disclosure provide an interactive method, apparatus, electronic device, storage medium and program product, which acquire a triggering operation of a user, display a first interactive interface in a display picture with the position of the first interactive interface being capable of moving with a moving operation of the user, and display an identification area in the display picture and convert the first interactive interface into a second interactive interface to be displayed at a position of the identification area when movement data of the first interactive interface satisfies a preset conversion condition. At this time, the second interactive interface is fixed in the identification area and is broken away from the hand or handle performing the triggering operation so that the user can make a decision through the second interactive interface with lower power consumption, thereby improving the convenience of the interactive operation of the user.

Figure 2:
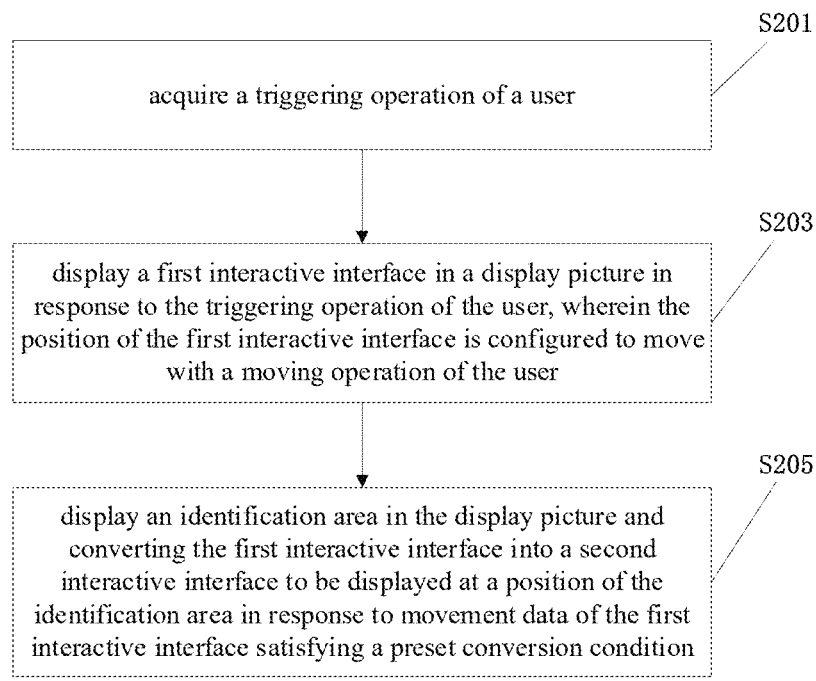
FIG. 2 is a schematic flow diagram of an interactive method provided by an embodiment of the present disclosure.

FIG. 2 shows a schematic flow diagram of an interactive method provided by an embodiment of the present disclosure. The interactive method includes the following steps:

Step S201: acquiring a triggering operation of a user. Here, different interactive modes correspond to different triggering operations.

In some embodiments, the mode of the interactive method is the gesture mode, and the step of acquiring a triggering operation of a user may includes:

acquiring a first one-hand gesture of the user; here, hand posture data of the user can be acquired by means of an image acquisition unit, a smart glove or the like.

As can be appreciated by people skilled in the art, the image acquisition unit may be disposed on the head-mounted display device or in the real space, which is not particularly limited herein.

For the method of determining the first one-hand gesture according to the posture data (e.g., image data), people skilled in the art can make a reasonable choice according to the type of the posture data, which is not particularly limited herein.

It should be noted that, the first one-hand gesture may be a posture or a combination of a series of postures, which is not limited.

Then, in response to the first one-hand gesture matching a trigger gesture, the first one-hand gesture is determined as the triggering operation.

Here, the trigger gesture is preset. For example, as shown in FIG. 3A to FIG. 3C, the trigger gesture is from opening in FIG. 3A to closing in FIG. 3B. When the first one-hand gesture of the user is opening and then closing, the first one-hand gesture can be determined as the trigger gesture, which indicates that the user has sent out the triggering operation. Of course, the trigger gesture may also be other gesture (e.g., kneading the thumb against the index finger), which is not particularly limited herein.

The interactive method of the embodiment of the present disclosure is not only applicable to the gesture mode, but is also applicable to a system in which a handle is used for interaction.

Thereby, in some embodiments, when the mode of the interactive method is the handle mode, the step of acquiring a triggering operation of a user includes: acquiring a triggering operation of the user on a first preset key of the handle. As an example, the first preset key herein may be the Menu key. It should be understood that, when the user triggers the first preset key, it indicates that the user has made the triggering operation.

Step S203: displaying a first interactive interface in a display picture (as shown in FIG. 4A) in response to the triggering operation of the user, wherein the position of the first interactive interface is configured to move with a moving operation of the user.

As described above, the display picture can be displayed through a display device. The display device herein may be a head-mounted display device, smart glasses or the like in an XR (e.g., VR, MR) system. Here, the display picture may be a virtual picture or a combination of a virtual picture and a real picture, which is not limited herein. It should be understood that, the display picture refers to a picture displayed through a display device, including a render picture, a real picture, as well as an interactive interface for game manipulation of the user.

Optionally, the first interactive interface is a shortcut menu. As can be appreciated by people skilled in the art, there are fewer functions in the shortcut menu, but these functions are more commonly used so that it is easy for the user to operate quickly and helps to improve the interaction efficiency.

Optionally, the first interactive interface 401 (as shown in FIGS. 4A-4B) is displayed above the hand or handle, covers the hand or handle, or is located at any preset position, which is not limited. When the first interactive interface 401 is displayed above the hand or handle, or covers the hand or handle, it is more intuitive as the first interactive interface moves with the hand or handle so that it helps the user to view it.

Further, the first interactive interface is configured to receive a choosing operation of a hand or handle which does not perform the triggering operation. It should be noted that, when the first interactive interface is displayed in the display picture, the user can choose an item of the first interactive interface by means of the hand or handle which does not perform the triggering operation, thereby achieving interaction with the XR device.

Here, as the first interactive interface moves with the hand or handle which performs the triggering operation, it is more convenient to perform the choosing operation by means of the hand or handle which does not perform the triggering operation and misoperations can be reduced.

Optionally, the moving operation of the user can be achieved through movement of the hand or handle which performs the triggering operation. Of course, the moving operation of the user may also be achieved through movement of other part (e.g., head) of the body, which is not particularly limited herein.

Step S205: displaying an identification area 402 in the display picture (as shown in FIG. 4C) and converting the first interactive interface into a second interactive interface 403 to be displayed at a position of the identification area (as shown in FIG. 4D) in response to movement data of the first interactive interface satisfying a preset conversion condition (as shown in FIG. 4B).

In some embodiments, the position of the identification area is determined based on the positions of the left and right hands or the left and right handles during the triggering operation. As can be appreciated by people skilled in the art, position information of the left and right hands or the left and right handles of the user can be determined by means of an image acquisition unit, a smart glove or the like. Of course, the position information of the left and right handles can also be determined by means of a positioning part of the left and right handles per se. There is no particular limitation on this in the present disclosure.

It should be noted that, the first interactive interface can move with the moving operation of the user. That is, the moving operation can drive the first interactive interface to move. When the movement data satisfies the preset conversion condition, the first interactive interface can be converted into the second interactive interface to be fixed at the position of the identification area so that the user can move more freely without the need of keeping a posture, thereby reducing the power consumption of interaction, increasing the comfort level of interaction and improving the interaction experience of the user.

Particularly, when the moving operation of the user is performed by the hand or handle which performs the triggering operation, the second interactive interface is fixed in such a way that the hand performing the triggering operation can move freely without the need of keeping a single posture, which can significantly improve the power consumption of the hand performing the triggering operation and increase the convenience in operation.

Optionally, the identification area is located in the middle of the left hand and the right hand or the left handle and the right handle. As an example, the distance from the identification area to the left hand (the left handle) is equal to the distance from the identification area to the right hand (the right handle).

Optionally, the size of the identification area may also be larger than the distance between the left hand and the right hand or between the left handle and the right handle.

Optionally, the identification area is suspended in the display picture. Optionally, the identification area is a feedback box, e.g., an opaque box.

As can be appreciated by people skilled in the art, the identification area can be fixed at a position in the display picture, and will not move with the change of the virtual picture or the real picture in the display picture.

In some embodiments, the second interactive interface may relate to the first interactive interface, e.g., is an expanded interface of the first interactive interface. In this way, it can be expanded without clicking one by one on the first interactive interface, so it is more convenient and helps to improve the interaction experience of the user. In some embodiments, the second interactive interface may also be an amplified interface of the first interactive interface.

As can be appreciated by people skilled in the art, the second interactive interface may also be a preset interface unrelated with the first interactive interface. For example, the user or the system may set contents of the first interactive interface and contents of the second interactive interface.

Compared to the first interactive interface, the second interactive interface may include more function options which the user chooses directly for operation.

Optionally, some of the function options in the second interactive interface can be expanded by clicking, which is not limited herein.

Further, the second interactive interface is configured to receive the choosing operation of the hand or handle which does not perform the triggering operation. It should be noted that, in a case that the second interactive interface is displayed in the display picture, the user can choose an item of the second interactive interface by means of the hand or handle which does not perform the triggering operation, thereby achieving interaction with the XR device. Here, it is more convenient to perform the choosing operation by means of the hand or handle which does not perform the triggering operation, and no misoperation will occur.

Of course, based on the set condition for interaction, the choosing operation of the hand or handle which performs the triggering operation may also be received.

In some embodiments, the preset conversion condition includes a preset conversion range and a preset conversion time. The step S205 includes: referring to FIG. 4B and FIG. 4C, displaying the identification area in the display picture in response to the first interactive interface moving to the preset conversion range, wherein the preset conversion range matches the position of the identification area.

It should be noted that, the word "match" herein refers to that there is a certain correspondence relationship between the preset conversion range and the range of the identification area, and the preset conversion range may be larger or smaller than the size of the identification area, which is not particularly limited.

Figure 5:
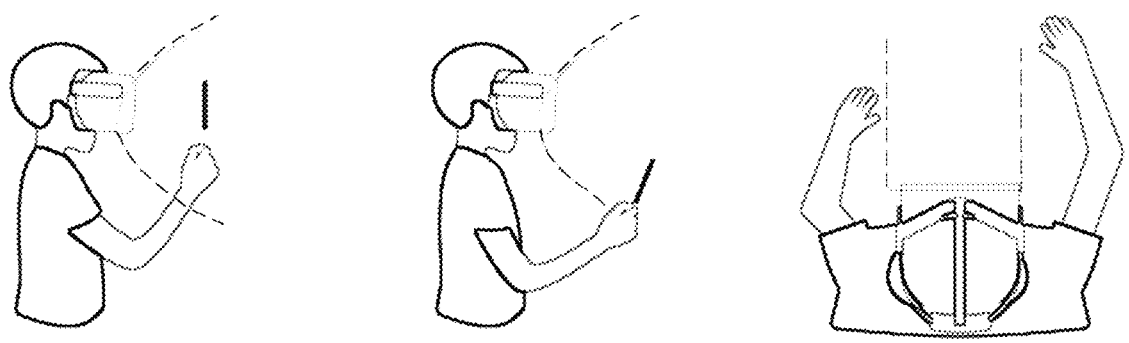
FIG. 5 is a schematic diagram of a preset conversion range provided by an embodiment of the present disclosure.

Optionally, referring to FIG. 5, in a first direction (e.g., the horizontal direction), the preset conversion range is a certain area between the left hand and the right hand or between the left handle and the right handle during the triggering operation (as shown by dotted lines in the right figure in FIG. 5).

Optionally, the area of the preset conversion range in the direction perpendicular to the first direction (e.g., the vertical direction) is the field of view of the display picture in this direction during the triggering operation, or a specified area of the field of view, e.g., the middle area (as shown by dotted lines in the left figure and the middle figure in FIG. 5).

In response to the duration for the first interactive interface to remain in the preset conversion range being no less than the preset conversion duration, the first interactive interface is converted into the second interactive interface to be displayed at the position of the identification area (as shown in FIG. 4D).

It should be noted that, the preset conversion time may be 200 ms, 300 ms or the like, which is not particularly defined herein.

In some embodiments, the preset conversion condition further includes a preset sight position; and the interactive method further includes: acquiring head posture information of the user; here, the head posture information of the user can be obtained through an inertial measurement unit (IMU). As can be appreciated by people skilled in the art, the inertial measurement unit may be disposed in a head-mounted display device, smart glasses or the like, which is not limited herein.

In response to determining that the sight of the user is located between the left hand and the right hand or between the left handle and the right handle (the sight of the user is located at the preset sight position) according to the head posture information, the identification area is displayed in the display picture; the display device is controlled to continue displaying the first interactive interface in response to determining that a sight of the user is not located between the left hand and the right hand or between the left handle and the right handle according to the head posture information.

In some embodiments, when the preset conversion condition includes both the preset conversion range and the preset sight position, the identification area will not be displayed in the display picture until the first interactive interface moves to the preset conversion range and the sight of the user is located between the left hand and the right hand or between the left handle and the right handle. That is, neither of the two conditions is dispensable, and the identification area cannot be displayed if either of the conditions is not satisfied. Of course, in other embodiments, the conditions for displaying the identification area may also be set according to actual needs.

By determining the sight position of the user, whether the user intends to convert the first interactive interface can be further determined. If the focus of the user is not between the two hands, then it indicates that the user has no intention of converting the first interactive interface. Thus, the accuracy of interaction is increased.

In some embodiments, after the step of converting the first interactive interface into a second interactive interface to be displayed at a position of the identification area, the interactive method further includes: acquiring a returning operation of the user. Here, the way of the returning operation may be set, and is not limited herein.

The second interactive interface is returned back into the first interactive interface to be displayed again in the display picture in response to the returning operation of the user.

As an example, the mode of the interactive method is the gesture mode, and the step of acquiring a returning operation of the user includes: acquiring a second one-hand gesture of the user. Optionally, the second one-hand gesture may be completed within the recognition range of the image acquisition device or in the vicinity of the identification area, which is not limited herein.

In response to the second one-hand gesture matching a return gesture, the second one-hand gesture is determined as the returning operation.

Optionally, the return gesture is closing the hand into a first (as shown in FIG. 3B).

As an example, the mode of the interactive method is the handle mode, and the step of acquiring a returning operation of the user includes: acquiring a triggering operation of the user on a second preset key of the handle, wherein the second preset key is configured to trigger the returning operation when the second interactive interface is included in the display picture.

It should be noted that, the second preset key may be the Menu key, i.e., the same key has different functions in different display pictures.

In some embodiments, the interactive method further includes: acquiring a closing operation of the user. Here, the specific way of the closing operation may be set, and will not be limited herein.

In response to the closing operation of the user, the first interactive interface or the second interactive interface is stopped being displayed in the display picture.

Figures 6A, 6B:
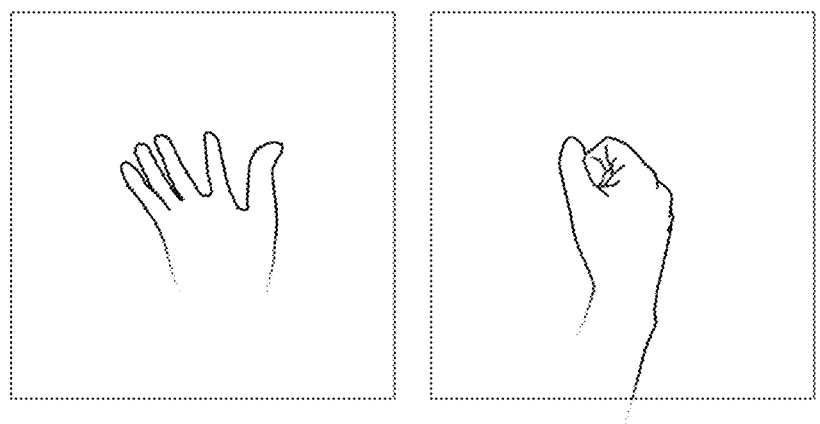
FIG. 6A to FIG. 6B are schematic diagrams of a close operation of an interactive method provided by an embodiment of the present disclosure.

As an example, the mode of the interactive method is the gesture mode, and the step of acquiring a closing operation of the user includes: acquiring a third one-hand gesture of the user; and determining the third one-hand gesture as the closing operation in response to the third one-hand gesture matching a closing gesture. Optionally, as shown in FIG. 6A and FIG. 6B, the closing gesture is opening the hand in front of the field of view (FIG. 6A) and then making a first (FIG. 6B). Optionally, in the case of displaying the first interactive interface, the closing gesture may be opening the hand.

As appreciated by people skilled in the art, a two-hand gesture may also be adopted, and this will not be listed herein.

As an example, the mode of the interactive method is the handle mode, and the step of acquiring a closing operation of the user includes: acquiring movement information of the handle; and determining the movement of the handle as the closing operation in response to the movement information matching the movement condition of the closing operation. Optionally, the movement condition is swinging the handle.

It should be noted that, the handle in the display picture may be in the form of the handle or in the form of a simulated hand, which is not limited herein.

It should be noted that, the method of the embodiment of the present disclosure can be executed by a single device, e.g., a head-mounted display device, VR glasses or the like. The method of the embodiment may also be applied in the distributed scene and completed by a plurality of devices in cooperation. In the case of the distributed scene, one of the plurality of devices can execute only one or more steps in the method of the embodiment of the present disclosure, and the plurality of devices interact with each other to complete the method.

It should be noted that, some embodiments of the present disclosure have been described above. Other embodiments are within the scope of the appended claims. In some cases, actions or steps recorded in the claims can be executed in an order different from that in the above embodiments, and can still achieve the desired result. In addition, the process depicted in the attached drawings does not necessarily require the particular order or consecutive order shown to achieve the desired result. In some implementations, multi-tasking and parallel processing may also be possible or may be advantageous.

Based on the same inventive concept, corresponding to the method of any of the above embodiments, the present disclosure further provides an interactive apparatus.

Figure 7:
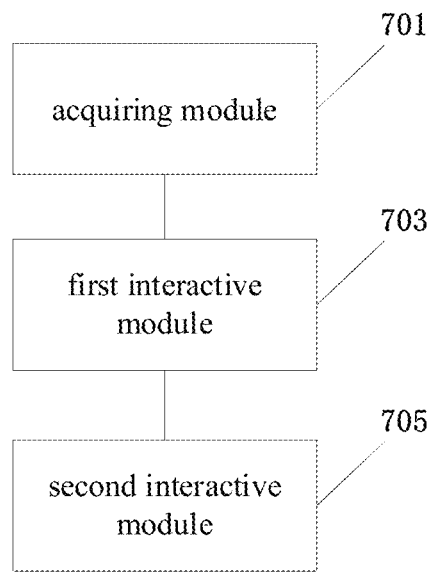
FIG. 7 is a schematic diagram of an exemplary apparatus provided by an embodiment of the present disclosure.

Referring to FIG. 7, the interactive apparatus includes an acquiring module 701, a first interactive module 703 and a second interactive module 705.

The acquiring module 701 is configured to acquire a triggering operation of a user.

The first interactive module 703 is configured to display a first interactive interface in a display picture in response to the triggering operation of the user, wherein the position of the first interactive interface is configured to move with a moving operation of the user.

The second interactive module 705 is configured to display an identification area in the display picture and convert the first interactive interface into a second interactive interface to be displayed at a position of the identification area in response to movement data of the first interactive interface satisfying a preset conversion condition.

In some embodiments, the position of the identification area is determined based on the position of the left hand and the right hand or the left handle and the right handle during the triggering operation.

In some embodiments, the second interactive interface is an expanded interface of the first interactive interface.

In some embodiments, the mode of the interactive method is the gesture mode, and the acquiring module 701 is configured to: acquire a first one-hand gesture of the user; and determine the first one-hand gesture as the triggering operation in response to the first one-hand gesture matching a trigger gesture. Alternatively, the mode of the interactive method is the handle mode, and the acquiring module 701 is configured to: acquire a triggering operation of the user on a first preset key of the handle.

In some embodiments, the preset conversion condition includes a preset conversion range and a preset conversion time. The second interactive module 705 is further configured to: display the identification area in the display picture in response to the first interactive interface moving to the preset conversion range; and convert the first interactive interface into the second interactive interface to be displayed at the position of the identification area in response to the duration for the first interactive interface to remain in the preset conversion range being no less than the preset conversion duration; the preset conversion range matches the position of the identification area.

In some embodiments, the preset conversion condition further includes a preset sight position. The acquiring module 701 is further configured to: acquire head posture information of the user. The second interactive module 705 is further configured to: control the display device to display the identification area in the display picture in response to determining that the sight of the user is located between the left hand and the right hand or between the left handle and the right handle according to the head posture information; continue displaying the first interactive interface in response to determining that a sight of the user is not located between the left hand and the right hand or between the left handle and the right handle according to the head posture information.

In some embodiments, the first interactive interface and the second interactive interface are configured to receive a choosing operation of a hand or handle which does not perform the triggering operation.

In some embodiments, the interactive apparatus further includes a return module, which is configured to: acquire a returning operation of the user; and return the second interactive interface back into the first interactive interface to be displayed again in the display picture in response to the returning operation of the user.

In some embodiments, the mode of the interactive method is the gesture mode, and the return module is further configured to: acquire a second one-hand gesture of the user; and determine the second one-hand gesture as the returning operation in response to the second one-hand gesture matching a return gesture. Alternatively, the mode of the interactive method is the handle mode, and the return module is further configured to: acquire a triggering operation of the user on a second preset key of the handle, wherein the second preset key is configured to trigger the returning operation in a case that the second interactive interface is included in the display picture.

In some embodiments, the interactive apparatus further includes a closing module, which is configured to: acquire a closing operation of the user; and in response to the closing operation of the user, stop displaying the first interactive interface or the second interactive interface in the display picture.

In some embodiments, the mode of the interactive method is the gesture mode, and the closing module is further configured to: acquire a third one-hand gesture of the user; and determine the third one-hand gesture as the closing operation in response to the third one-hand gesture matching a closing gesture. Alternatively, the mode of the interactive method is the handle mode, and the closing module is further configured to: acquire movement information of the handle; and determine the movement of the handle as the closing operation in response to the movement information matching the movement condition of the closing operation.

For convenience of description, in description of the above apparatus, the apparatus is divided into various modules in terms of functions so as to be described separately. Of course, the functions of the modules can be implemented in one or more software and/or hardware in implementation of the present disclosure.

The apparatus of the above embodiment is used to implement the corresponding interactive method in any of the above embodiments, and has the beneficial effects of the corresponding method embodiment, which will not be further described herein.

An embodiment of the present disclosure provides an interactive method, which includes:
- step S201: acquiring a triggering operation of a user;
- step S203: displaying a first interactive interface in a display picture in response to the triggering operation of the user, wherein the position of the first interactive interface is configured to move with a moving operation of the user; and
- step S205: displaying an identification area in the display picture and converting the first interactive interface into a second interactive interface to be displayed at a position of the identification area in response to movement data of the first interactive interface satisfying a preset conversion condition.

In some embodiments, the position of the identification area is determined based on the position of the left hand and the right hand or the left handle and the right handle during the triggering operation.

In some embodiments, the second interactive interface is an expanded interface of the first interactive interface.

In some embodiments, the mode of the interactive method is the gesture mode, and the step of acquiring a triggering operation of a user includes: acquiring a first one-hand gesture of the user; and determining the first one-hand gesture as the triggering operation in response to the first one-hand gesture matching a trigger gesture. Or, the mode of the interactive method is the handle mode, and the step of acquiring a triggering operation of a user includes: acquiring a triggering operation of the user on a first preset key of the handle.

In some embodiments, the preset conversion condition includes a preset conversion range and a preset conversion time; the step of displaying an identification area in the display picture and converting the first interactive interface into a second interactive interface to be displayed at a position of the identification area in response to movement data of the first interactive interface satisfying a preset conversion condition includes: displaying the identification area in the display picture in response to the first interactive interface moving to the preset conversion range; and converting the first interactive interface into the second interactive interface to be displayed at the position of the identification area in response to the duration for the first interactive interface to remain in the preset conversion range being no less than the preset conversion duration, wherein the preset conversion range matches the position of the identification area.

In some embodiments, the preset conversion condition further includes a preset sight position; the interactive method further includes: acquiring head posture information of the user; displaying the identification area in the display picture in response to determining that the sight of the user is located between the left hand and the right hand or between the left handle and the right handle according to the head posture information; or, continuing displaying the first interactive interface in response to determining that a sight of the user is not located between the left hand and the right hand or between the left handle and the right handle according to the head posture information.

In some embodiments, the first interactive interface and the second interactive interface are configured to receive a choosing operation of a hand or handle which does not perform the triggering operation.

In some embodiments, after the step of converting the first interactive interface into a second interactive interface to be displayed at a position of the identification area, the interactive method further includes: acquiring a returning operation of the user; and returning the second interactive interface back into the first interactive interface to be displayed again in the display picture in response to the returning operation of the user.

In some embodiments, the mode of the interactive method is the gesture mode, and the step of acquiring a returning operation of the user includes:

acquiring a second one-hand gesture of the user;

determining the second one-hand gesture as the returning operation in response to the second one-hand gesture matching a return gesture; or the mode of the interactive method is the handle mode, and the step of acquiring a returning operation of the user includes:

acquiring a triggering operation of the user on a second preset key of the handle, wherein the second preset key is configured to trigger the returning operation in a case that the second interactive interface is included in the display picture.

In some embodiments, the interactive method further includes: acquiring a closing operation of the user; and in response to the closing operation of the user, stopping displaying the first interactive interface or the second interactive interface in the display picture.

In some embodiments, the mode of the interactive method is the gesture mode, and the step of acquiring a closing operation of the user includes:

acquiring a third one-hand gesture of the user;

determining the third one-hand gesture as the closing operation in response to the third one-hand gesture matching a closing gesture; or the mode of the interactive method is the handle mode, and the step of acquiring a closing operation of the user includes:

acquiring movement information of the handle; and determining the movement of the handle as the closing operation in response to the movement information matching the movement condition of the closing operation.

An embodiment of the present disclosure further provides an interactive apparatus, which includes an acquiring module 701, a first interactive module 703 and a second interactive module 705.

The acquiring module 701 is configured to acquire a triggering operation of a user.

The first interactive module 703 is configured to display a first interactive interface in a display picture in response to the triggering operation of the user, wherein the position of the first interactive interface is configured to move with a moving operation of the user.

The second interactive module 705 is configured to display an identification area in the display picture and convert the first interactive interface into a second interactive interface to be displayed at a position of the identification area in response to movement data of the first interactive interface satisfying a preset conversion condition.

Based on the same inventive concept, corresponding to the method of any of the above embodiments, the present disclosure further provides an electronic device, which includes a memory, a processor and a computer program which is stored in the memory and executable on the processor. The interactive method described in any of the above embodiments is implemented by the processor when executing the program.

Figure 8:
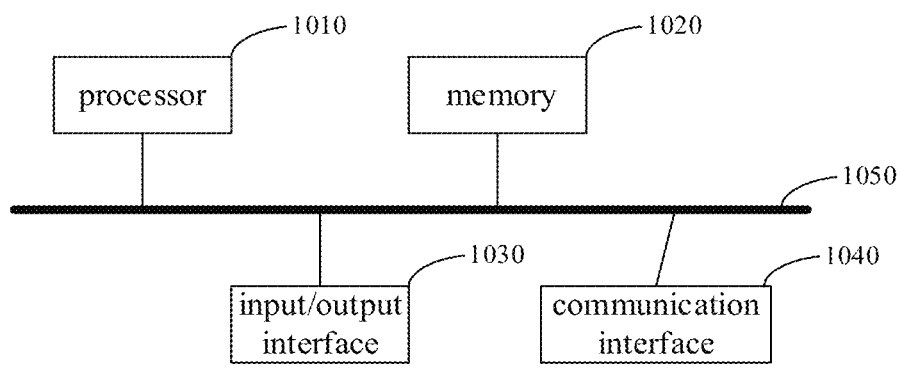
FIG. 8 is a schematic diagram of the hardware structure of an exemplary electronic device provided by an embodiment of the present disclosure.

FIG. 8 illustrates a schematic diagram of the hardware structure of a more specific electronic device provided by this embodiment. The device may include: a processor 1010, a memory 1020, an input/output interface 1030, a communication interface 1040 and a bus 1050. The processor 1010, the memory 1020, the input/output interface 1030 and the communication interface 1040 are communicatively connected with each other within the device via the bus 1050.

The processor 1010 may be implemented as a general central processing Unit (CPU), a microprocessor, an Application Specific Integrated Circuit (ASIC), one or more integrated circuits or the like for executing related programs to implement the technical solutions provided by the embodiments of this specification.

The memory 1020 may be implemented as a Read Only Memory (ROM), a Random Access Memory (RAM), a static storage device, a dynamic storage device or the like. The memory 1020 can have operating systems and other applications stored therein. When the technical solutions provided by the embodiments of this specification are implemented through software or firmware, related procedure codes are stored in the memory 1020 and are invoked and executed by the processor 1010.

The input/output interface 1030 is used to connect input/output modules to achieve information input and output. The input/output modules may be configured in the device as components (not shown), or externally connected to the device to provide corresponding functions. The input devices may include keyboards, mice, touch screens, microphones, all kinds of sensors and so on, and the output devices may include displays, speakers, vibrators, indicator lights and so on.

The communication interface 1040 is used to connect communication modules (not shown) to achieve communication interaction between this device and other devices. The communication modules may achieve communication in a wired way (e.g., USB, cable, etc.) or in a wireless way (e.g., mobile network, WIFI, Bluetooth, etc.).

The bus 1050 includes a path for communicating information among the various components (e.g., the processor 1010, the memory 1020, the input/output interface 1030 and the communication interface 1040) of the device.

It should be noted that, although only the processor 1010, the memory 1020, the input/output interface 1030, the communication interface 1040 and the bus 1050 of the device are shown, the device may further include other components necessary for normal operation in specific implementation. Furthermore, as can be appreciated by people skilled in the art, the above device may also only include components necessary for the solutions of the embodiments of this specification and not have to include all the components shown in the drawings.

The electronic device of the above embodiment is used to implement the corresponding interactive method in any of the above embodiments, and has the beneficial effects of the corresponding method embodiment, which will not be further described herein.

Based on the same inventive concept, corresponding to the method of any of the above embodiments, the present disclosure further provides a non-transient computer readable storage medium. The non-transient computer readable storage medium has a computer instruction stored therein, and the computer instruction is used to enable a computer to implement the interactive method as described in any of the above embodiments.

The computer readable medium of this embodiment includes permanent and non-permanent, removable and non-removable media, and can achieve information storage by means of any method or technique. The information may be computer readable instructions, data structures, modules of a program, or other data. Examples of the computer storage medium include but are not limited to a phase-change random access memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a read-only compact disc read-only memory (CD-ROM), a digital versatile disc (DVD) or other optical storage, a magnetic cassette tape, a magnetic tape disc storage or other magnetic storage devices or any other non-transmission medium for storing information accessible by computing devices.

The computer instruction stored in the storage medium of the above embodiment is used to enable the computer to implement the interactive method as described in any of the above embodiments, and has the beneficial effects of the corresponding method embodiment, which will not be further described herein.

Based on the same inventive concept, corresponding to the method of any of the above embodiments, the present disclosure further provides a computer program product, which includes a computer program. In some embodiments, the computer program is executed by one or more processors to enable the one or more processors to implement the interactive method described in the above embodiments.

As appreciated by those of ordinary skill in the art, discussion of any of the above embodiments is only exemplary, but is not intended to imply that the scope of the present disclosure (including the claims) is limited to these examples. According to the idea of the present disclosure, in the above embodiments or different embodiments, the technical features may also be combined, the steps may be implemented in any order, and there are many other variations in different aspects of the embodiments of the present disclosure as described above, which are not provided in detail for brevity.

In addition, to simplify description and discussion and to avoid the embodiments of the present disclosure from being beyond understanding, publicly known power supply/ground connection with integrated circuit (IC) chips and other parts may be illustrated or not be illustrated in the provided drawings. Furthermore, the apparatuses may be illustrated in a block diagram in order to avoid the embodiments of the present disclosure from being beyond understanding, and this also takes into account the fact that the details about implementation of the apparatuses in the block diagram highly depend on the platform which will implement the embodiments of the present disclosure (i.e., the details should be completely within the understanding scope of people skilled in the art). In the case that the specific details (e.g., the circuit) are set forth to describe the exemplary embodiments of the present disclosure, it is obvious to people skilled in the art that the embodiments of the present disclosure can be implemented without these specific details or with changes to these specific details. Accordingly, the description should be considered as being illustrative but not limited.

Although the present disclosure has been described in conjunction with the specific embodiments of the present disclosure, many substitutions, modifications and variations of these embodiments would be obvious to those of ordinary skill in the art based on the foregoing description. For example, other memory architectures (e.g., a dynamic RAM (DRAM) can use the discussed embodiments.

The embodiments of the present disclosure are intended to cover all such substitutions, modifications and variations that fall within the broad scope of the attached claims. Therefore, any omission, modification, equivalent substitution, improvement, etc. made within the spirit and principles of the embodiments of the present disclosure shall be included in the scope of protection of the present disclosure.

What is claimed is:

1. An interactive method, comprising:
    acquiring a triggering operation of a user;
    displaying a first interactive interface in a display picture in response to the triggering operation of the user, wherein a position of the first interactive interface is configured to move with a moving operation of the user;
    displaying an identification area in the display picture in response to movement data of the first interactive interface satisfying a preset conversion condition;
    converting the first interactive interface into a second interactive interface to be displayed at a position of the identification area; and
    displaying the second interactive interface at the position of the identification area, wherein the second interactive interface is fixed in the identification area.

2. The interactive method of claim 1, wherein the position of the identification area is determined based on positions of a left hand and a right hand during the triggering operation.

3. The interactive method of claim 1, wherein the second interactive interface is an expanded interface of the first interactive interface.

4. The interactive method of claim 1, wherein a mode of the interactive method is a gesture mode, and the acquiring a triggering operation of a user comprises:
    acquiring a first one-hand gesture of the user; and
    determining the first one-hand gesture as the triggering operation in response to the first one-hand gesture matching a trigger gesture.

5. The interactive method of claim 1, wherein the preset conversion condition comprises a preset conversion range and a preset conversion time;
    the displaying the identification area in the display picture and converting the first interactive interface into a second interactive interface to be displayed at a position of the identification area in response to movement data of the first interactive interface satisfying a preset conversion condition, comprises:
        displaying the identification area in the display picture in response to the first interactive interface moving to the preset conversion range; and
        converting the first interactive interface into the second interactive interface to be displayed at the position of the identification area in response to a duration for the first interactive interface to remain in the preset conversion range being no less than the preset conversion duration, wherein the preset conversion range matches the position of the identification area.

6. The interactive method of claim 5, wherein the preset conversion condition further comprises a preset sight position, the interactive method further comprises:
acquiring head posture information of the user;
displaying the identification area in the display picture in response to determining that a sight of the user is located between the left hand and the right hand or between the left handle and the right handle according to the head posture information; and
continuing displaying the first interactive interface in response to determining that a sight of the user is not located between the left hand and the right hand or between the left handle and the right handle according to the head posture information.

7. The interactive method of claim 1, wherein the first interactive interface and the second interactive interface are configured to receive a choosing operation of a hand or handle which does not perform the triggering operation.

8. The interactive method of claim 1, wherein after the converting the first interactive interface into a second interactive interface to be displayed at a position of the identification area, the interactive method further comprises:
acquiring a returning operation of the user; and
returning the second interactive interface back into the first interactive interface to be displayed again in the display picture in response to the returning operation of the user.

9. The interactive method of claim 8, wherein a mode of the interactive method is a gesture mode, and the acquiring a returning operation of the user comprises:
acquiring a second one-hand gesture of the user; and
determining the second one-hand gesture as the returning operation in response to the second one-hand gesture matching a return gesture; or
the mode of the interactive method is a handle mode, and the acquiring a returning operation of the user comprises:
acquiring a triggering operation of the user on a second preset key of a handle, wherein the second preset key is configured to trigger the returning operation in a case that the second interactive interface is comprised in the display picture.

10. The interactive method of claim 1, further comprising:
acquiring a closing operation of the user; and
stopping displaying the first interactive interface or the second interactive interface in the display picture in response to the closing operation of the user.

11. The interactive method of claim 10, wherein a mode of the interactive method is a gesture mode, and the acquiring a closing operation of the user comprises:
acquiring a third one-hand gesture of the user; and
determining the third one-hand gesture as the closing operation in response to the third one-hand gesture matching a closing gesture; or
the mode of the interactive method is a handle mode, and the acquiring a closing operation of the user comprises:
acquiring movement information of a handle; and
determining a movement of the handle as the closing operation in response to the movement information matching a movement condition of the closing operation.

12. An electronic device, comprising:
at least one memory; and
at least one processor,
wherein a computer program that executable on at least one processor is stored on the at least one memory, the at least one processor, when executing the computer program, implements an interactive method comprising:
acquiring a triggering operation of a user;
displaying a first interactive interface in a display picture in response to the triggering operation of the user, wherein a position of the first interactive interface is configured to move with a moving operation of the user;
displaying an identification area in the display picture in response to movement data of the first interactive interface satisfying a preset conversion condition;
converting the first interactive interface into a second interactive interface to be displayed at a position of the identification area; and
displaying the second interactive interface at the position of the identification area, wherein the second interactive interface is fixed in the identification area.

13. The electronic device of claim 12, wherein the position of the identification area is determined based on positions of a left hand and a right hand during the triggering operation.

14. The electronic device of claim 12, wherein the second interactive interface is an expanded interface of the first interactive interface.

15. The electronic device of claim 12, wherein a mode of the interactive method is a gesture mode, and the acquiring a triggering operation of a user comprises:
acquiring a first one-hand gesture of the user; and
determining the first one-hand gesture as the triggering operation in response to the first one-hand gesture matching a trigger gesture.

16. The electronic device of claim 12, wherein the preset conversion condition comprises a preset conversion range and a preset conversion time;
the displaying the identification area in the display picture and converting the first interactive interface into a second interactive interface to be displayed at a position of the identification area in response to movement data of the first interactive interface satisfying a preset conversion condition, comprises:
displaying the identification area in the display picture in response to the first interactive interface moving to the preset conversion range; and
converting the first interactive interface into the second interactive interface to be displayed at the position of the identification area in response to a duration for the first interactive interface to remain in the preset conversion range being no less than the preset conversion duration,
wherein the preset conversion range matches the position of the identification area.

17. The electronic device of claim 16, wherein the preset conversion condition further comprises a preset sight position, the interactive method further comprises:
acquiring head posture information of the user;
displaying the identification area in the display picture in response to determining that a sight of the user is located between the left hand and the right hand or between the left handle and the right handle according to the head posture information; and
continuing displaying the first interactive interface in response to determining that a sight of the user is not located between the left hand and the right hand or between the left handle and the right handle according to the head posture information.

18. The electronic device of claim 12, wherein the first interactive interface and the second interactive interface are configured to receive a choosing operation of a hand or handle which does not perform the triggering operation.

19. The electronic device of claim 12, wherein after the converting the first interactive interface into a second interactive interface to be displayed at a position of the identification area, the interactive method further comprises:
    acquiring a returning operation of the user; and
    returning the second interactive interface back into the first interactive interface to be displayed again in the display picture in response to the returning operation of the user.

20. A non-transient computer readable storage medium storing computer instructions for causing a computer to perform the interactive method comprising:

acquiring a triggering operation of a user;

displaying a first interactive interface in a display picture in response to the triggering operation of the user, wherein a position of the first interactive interface is configured to move with a moving operation of the user;

displaying an identification area in the display picture in response to movement data of the first interactive interface satisfying a preset conversion condition;

converting the first interactive interface into a second interactive interface to be displayed at a position of the identification area; and displaying the second interactive interface at the position of the identification area, wherein the second interactive interface is fixed in the identification area.

\* \* \* \* \*